United States Patent [19]

Dunavan et al.

[11] Patent Number: 4,806,747
[45] Date of Patent: Feb. 21, 1989

[54] OPTICAL DIRECTION OF ARRIVAL SENSOR WITH CYLINDRICAL LENS

[75] Inventors: David S. Dunavan, Norwalk; Richard Babish, Wilton, both of Conn.

[73] Assignee: The Perkin-Elmer Corporation, Norwalk, Conn.

[21] Appl. No.: 157,779

[22] Filed: Mar. 28, 1988

[51] Int. Cl.$^4$ ............................................. G01J 1/20
[52] U.S. Cl. ................................. 250/203 R; 356/152
[58] Field of Search .................... 250/203 S, 203 R; 126/425; 356/152, 141; 350/433

[56] References Cited

U.S. PATENT DOCUMENTS

| | | | |
|---|---|---|---|
| 3,581,099 | 5/1971 | Franke | 250/203 R |
| 3,954,340 | 5/1976 | Blomquist et al. | 250/203 R |
| 4,075,034 | 2/1978 | Butler | 250/203 R |
| 4,083,636 | 4/1978 | Owen | 250/203 R |
| 4,211,922 | 7/1980 | Vaerewyck et al. | 250/203 R |
| 4,769,546 | 9/1988 | Kniffler et al. | 250/203 R |

Primary Examiner—David C. Nelms
Assistant Examiner—Michael Messinger
Attorney, Agent, or Firm—Thomas P. Murphy; Edwin T. Grimes; Richard C. Wilder

[57] ABSTRACT

An improved optical direction of arrival sensor in which incoming radiation passes through a cylindrical lens placed through a top mask and is focused in the gap between the lens and a detector array concentric about the back of the lens. The focal line then expands and falls on the detector array which embodies an encoding scheme. The output from the encoded detector is then processed to determine the angle of incidence of the incoming radiation with the top mask.

11 Claims, 2 Drawing Sheets

FOUR BIT DIFFERENTIAL GREY CODE

BIT A = 1 IF (A−A') > 0
BIT B = 1 IF (B−B') > 0
BIT C = 1 IF (C−C') > 0
BIT D = 1 IF (D−D') > 0

OPTICAL DIRECTION OF ARRIVAL SENSOR WITH CYLINDRICAL LENS

BACKGROUND OF THE INVENTION

This invention pertains generally to radiation detectors and more specifically to radiation detectors providing a digital signal indicative of the angle of incidence of a radiation beam with the detector.

The optical direction of arrival sensor disclosed in the present application is closely related to the optical direction of arrival sensor disclosed in the application entitled "Direction of Arrival Sensor", filed on even date herewith by D. S. Dunavan et al., Ser. No. 174,059 and assigned to the assignee of this application. The disclosure therein is incorporated herein by reference.

The optical direction of arrival sensor in the co-pending application discloses a top mask with one slit or a plurality of parallel slits through it. Incident radiation passes through a slit and forms a rectangle or bar of radiation on a flat detector array which embodies Gray code encoding means. The detector array is arranged in rows, each row being perpendicular to the bar of radiation. As is more fully explained in the co-pending application, each of the rows generates an electrical signal which is a function of the location of the bar on the row. This electrical signal is then processed to yield a digital bit of information, that is a 1 or a 0. The combination of each of these bits from each row produces the digital angle-of-arrival word which uniquely indicates where the radiation bar falls on the detector array. This angle-of-arrival word, in turn, bears a direct relationship to the angle of incidence of the incoming radiation with the detector and can be processed to yield that angle.

While the apparatus disclosed in the co-pending application operates successfully, our contribution is an improvement over the prior art which results in improved sensitivity of the optical direction of arrival sensor by increasing the effective aperture of the slit or slits. The improved optical direction of arrival sensor also permits operation of the sensor with lower optical intensities than previously possible, while providing uniform sensitivity throughout the entire field of view. These, and other advantages over the prior art will become clear as the description proceeds.

BRIEF DESCRIPTION OF THE INVENTION

The invention contemplates placing a cylindrical lens in and along the length of each slit aperture of the direction of arrival sensor of the co-pending application. The present invention also contemplates replacing the flat detector array of the co-pending application with a detector array disposed on an arc concentric about, and spaced from, the back portion of the cylindrical lens.

As in the co-pending application, the detector array is arranged in rows, each row being perpendicular to the bar of radiation emanating from the cylindrical lens. Each row in the detector array is divided into segments. These segments are sized and arranged differently from one row to the next so as to embody the Gray code encoding scheme in a manner to be explained.

The segments are further sub-divided and placed on facets so as to be placed approximately on an arc concentric about and spaced from the back portion of the cylindrical lens.

The cylindrical lens itself has a front half and a back half, each with a unique radius of curvature and each with the same index of refraction. It is a well known characteristic of cylindrical lenses that when the index of refraction of the lens material is 2.0 and the radius of curvature of the back half of the lens is equal to that of the front half of the lens, any radiation incident on the front surface will be focused exactly on the back surface of the lens.

For reasons discussed below, it is desired that the radiation incident on the front half of the cylindrical lens be focused in the gap between the back half of the lens and the detector array. This is accomplished by making the radius of curvature of the back half of the lens less than the front half when the index of refraction of the lens material is greater than or equal to 2.0. Conversely, if the index of refraction is less than 2.0 the radius of curvature of the back half of the lens is greater than the front half.

Forming the focal line in the gap between the back half of the lens and the detector array is desired for two reasons. First, if the focal line were to fall on the detector array such a line would, at some angles of incidence, fall between the segments on a given row. This would result in an ambiguous signal from that row. Second, if the focal line were to fall on the back surface of the lens the radiation would be affected by any surface defects, scratches or dirt on the lens. These surface effects would perturb the radiation transmitted through the lens and would be amplified as the focal line expands from the lens and is projected onto the detector elements. Such amplified surface effects would also result in ambiguous or erroneous signals from the detector rows.

As mentioned in reference to the Gray code encoding scheme, the segment sizes differ from one row to the next. The focal line for the radiation emanating from the back surface of the lens is so located in the gap between the lens and the detector array that the radiation bar diverging from the focal line forming on the detector array is of the same width as the smallest segment. If the width were greater, resolution would be lost as the radiation bar would fall on three or more of the smallest segments. If the width of the radiation bar were less, significant energy could be lost as more of the radiation falls into the gaps between segments.

The segments are placed on facets which are located on an arc which is concentric about the back side of the cylindrical lens. This results in constant performance for the direction of arrival sensor over a wide field of view as the image will move from segment to segment as the angle of incidence is varied with little change in intensity or resolution, even at large angles off the normal axis.

An aperture stop is included in the cylindrical lens to define the angular width of the wedge of light leaving the back side of the lens. As previously discussed, the radiation bar incident on the detector array should be the same width as the smallest segment. If, due to fabrication constraints, the focal line cannot be located close enough to the detector array, the radiation may diverge to cover more than one segment. Accordingly, an aperture stop is chosen to limit the width of the radiation beam passing through the cylindrical lens and therefore the width of the radiation bar incident on the detector array.

Other features and advantages of the invention will become obvious to one skilled in the art upon reading the following detailed description of the invention, in conjunction with the accompanying drawing. Those skilled in the art will appreciate that the conception upon which the disclosure is based may readily be utilized as a basis for the designing of other structures for carrying out the several purposes of the invention. It is important, therefore, that the claims be regarded as including such equivalent structures as do not depart from the spirit and scope of the invention.

DETAILED DESCRIPTION OF THE PREFERRED EMBODIMENT OF THE INVENTION

Figure 1:
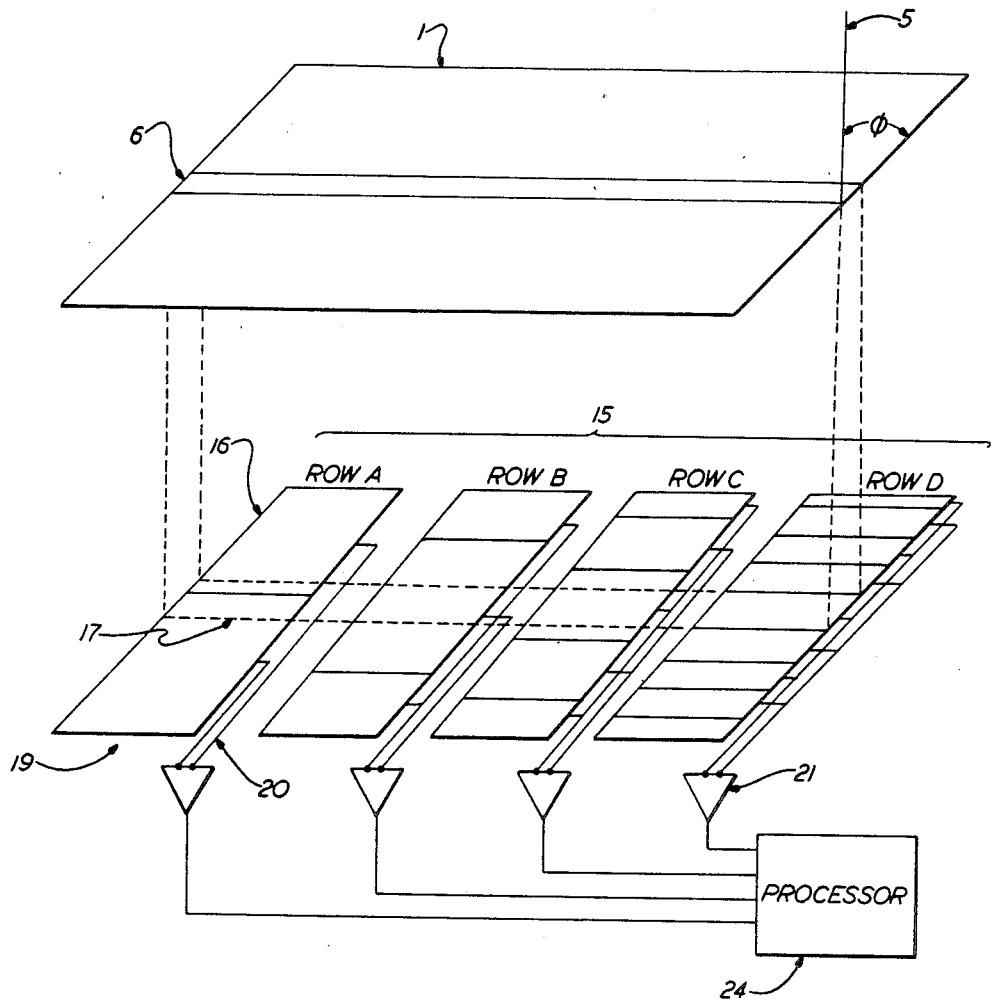
FIG. 1 is a schematic view of a direction of arrival sensor showing a slit aperture according to the prior art.

FIG. 1 shows, in schematic form, a direction of arrival sensor of the type more fully disclosed in the above identified co-pending application.

The top mask 1 has a slit 6 formed therein. There may be one or more such slits 6 in each top mask 1. Incident radiation 5 passes through the slit 6 to form a radiation bar 17 on the detector array 15 perpendicular to the individual rows 19. The position of the radiation bar 17 on the detector array 15 bears a direct relationship to the angle of incidence, 8, the incident radiation 5 makes with the top mask 1.

The detector array 15 shown is one of the forms of such arrays disclosed in the co-pending application. It can be appreciated by those skilled in the art that alternate arrays can be utilized to carry out the several purposes of the present invention and the invention disclosed in the co-pending application.

The detector array 15 shown in FIG. 1 has, for example only, four rows. The individual rows 19 are designated Row A, Row B, Row C and Row D. The individual rows 19 are further divided into segments 16 which are electrically isolated from one another in any convenient manner. The number of segments 16 in each row and the orientation of the segments 16 about the longitudinal centerline of the detector array 15 determines the encoding scheme. For purposes of illustration a coventional reflected binary Gray code encoding scheme is described in reference to the present invention. It can be appreciated by those skilled in the art, however, that other encoding schemes can be used to accomplish the several purposes of the present invention and the invention disclosed in the co-pending application.

When the radiation bar 17 is incident on the detector array 15, it will fall on one or more of the segments 16 in each individual row 19. The radiation in the radiation bar 17 stimulates the segment 16 upon which it is incident to produce an electric current. This electric current travels through connectors 20, of which there are two for each row. The two connectors 20 from each individual row 19 are connected to comparators 21 which compare the magnitude of the electrical current in the two connectors 20. The result of this comparison is then converted into a digital bit in processor 24. This conversion is discussed more fully in reference to FIG. 1A, hereinbelow. The connector 20 which carries the greatest current is the one connected to the segment upon which the greatest portion of the radiation bar 17 is incident. This relationship can be clearly seen in reference to FIG. 1A and the truth table associated therewith.

Figure 1A:
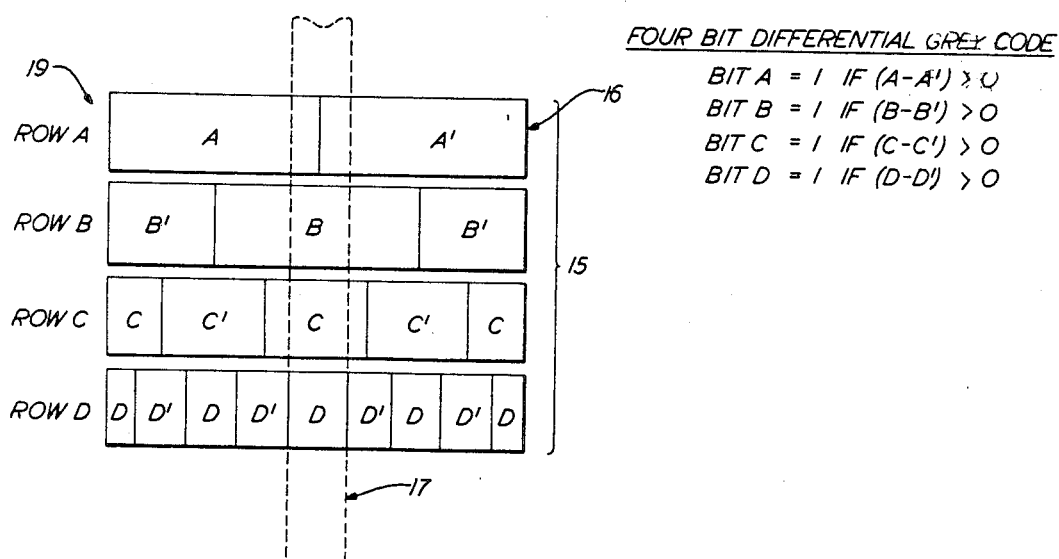
FIG. 1A is a plan view of a detector array embodying the Grey code encoding scheme with a truth table for such an encoding scheme according to the prior art.

In the example shown in FIG. 1A the radiation bar 17 lies on the longitudinal centerline of the detector array 15. Each of the rows 19 is divided into segments 16 as described in reference to FIG. 1. Every other segment in each row 19 is connected to a common connector 20, as shown in FIG. 1. Thus, for example, in Row C the left C, middle C and right C are connected to one connector 20 and the two C' are connected to another connector 20. The output from one connector 20 from each row 19 is compared with the other connector 20 from each row 19 by the comparators 21 shown in FIG. 1. This conversion from the analog output from the comparator 21 to a digital bit yields a 1 or 0 depending on the solution to the truth table shown for FIG. 1A. The combination of Bit A from Row A, Bit B from Row B, Bit C from Row C and Bit D from Row D yields an angle-of-arrival word which uniquely determines the angle of incidence, $\theta$, incoming radiation 5 makes with the top mask 6 in a manner described in the co-pending application.

Figure 2:
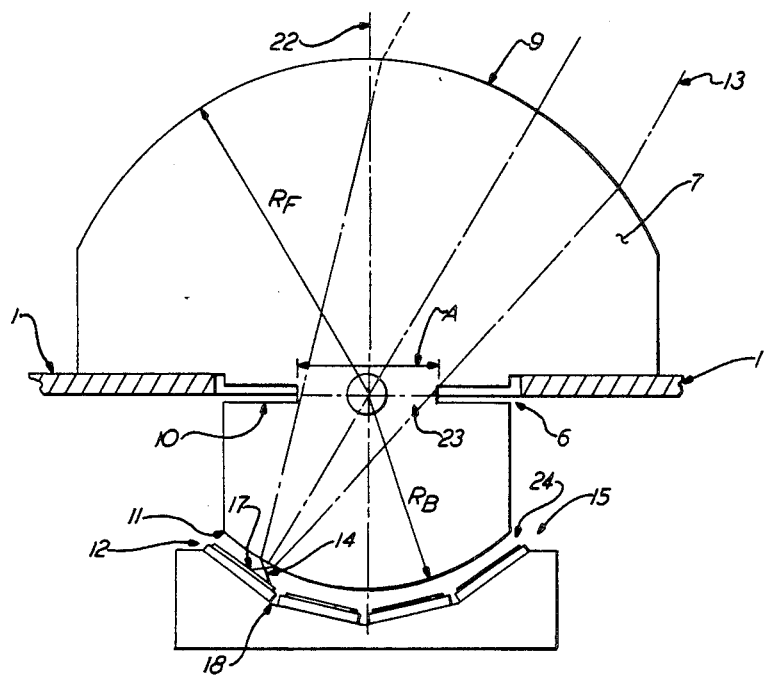
FIG. 2 is an end view of a monolithic cylindrical lens with an index of refraction greater than 2.0 shown assembled into the direction of arrival sensor of FIG. 1.

As shown in FIG. 2 the present invention illustrates a cylindrical lens 7 disposed in the slit 6 in the detector top mask 1 of FIG. 1.

The cylindrical lens 7 is monolithic, being of one piece and of a single material throughout. An imaginary plane through the center of the lens 7 and normal to the optical axis 22 divides the lens 7 into a front half 9 and a back half 11. The radius of curvature of the front half is designated '$R_f$' while that of the back half is designated '$R_b$'. On the same plane through the center of the lens and normal to the optical axis 22 is an aperture stop 23. The width of the aperture stop 23 is designated 'A' in FIG. 2 and extends equidistantly on either side of the center of the lens 7. The aperture stop 23 extends the full length of the lens 7.

The detector array 15 is located on an arc which is concentric about the center of the lens 7. This arc is located so that its longitudinal centerline is coincident with the optical axis 22 of the lens. The arc is also located so that a gap is formed betwen the back half of the lens 11 and the detector array 15. As is described herein in reference to FIG. 3 the detector array 15 is disposed on individual facets 12. For example, four facets 12 are shown in FIG. 2 with gaps 18 between each.

The operation of the improved optical direction of arrival sensor shown in side view in FIG. 2 can be described as follows.

Incident light 13 passes into the cylindrical lens 7 through the front surface 9. It is then refracted, as shown in FIG. 2, and converges as it approaches the back half of the lens. It is well known that a cylindrical lens, with an index of refraction of 2.0 and $R_f = R_b$ will focus incident radiation 13 on a focal line which lies on the back surface of the lens directly on the centerline of the incident radiation 13. An index of refraction greater than 2.0 with $R_f = R_b$ will focus the incident light 13 at a line inside the cylindrical lens 7. Conversely, an index of refraction less than 2.0 and $R_f = R_b$ will focus the incident radiation 13 at a line some distance from the back half 11 of a cylindrical lens 7.

As will be discussed below, the present invention contemplates forming the focus line 14 in the gap 24 between the back half of the lens 11 and the detector array 15 so that a rectangular bar of radiation 17 is formed on the detector array 15. This can be accomplished by taking advantage of the focal length of a cylindrical lens and making $R_b$ less than $R_f$ when the index of refraction of the material of the lens 7 is equal to or greater than 2.0. If the index of refraction of the material of the lens 7 is less than 2.0, $R_f$ will be less than $R_b$.

The incident light 13 is focused as a line 14 in the gap 24 between the back half of the lens 11 and the detector array 15. Focusing the line on the surface of the back half of the lens 11 would cause the radiation to be adversely affected by any surface defects, scratches or dirt on the lens. These surface defects would perturb the radiation transmitted through the lens, and would be amplified as the focal line expands and is projected onto the detector array 15. Focusing the incoming radiation 13 directly onto the detector array 15 could cause a loss of information as, at some angles of incidence, $\theta$, the focal line could fall between segments 16 on a given row 19 as can be more clearly seen in reference to FIG. 1A.

Accordingly, the focal line 14 is located in the gap 24 between the back half of the lens 11 and the detector array 15 by selecting appropriate values of $R_f$ and $R_b$, depending on the index of refraction. The distance of the focal line 14 from the detector array 15 is chosen so that the width of the radiation bar 17 is equal to the width of the smallest segment. In the example illustrated by FIG. 1 this would be the width of the segments 16 in Row D. Such a width ensures an unambiguous signal from the comparator 21 as no more than two contiguous segments 16 would be touched by the radiation bar 17 for any given angle of incidence, $\theta$. This is true since the comparator 21 measures the relative output from contiguous segments 16.

Figure 3:
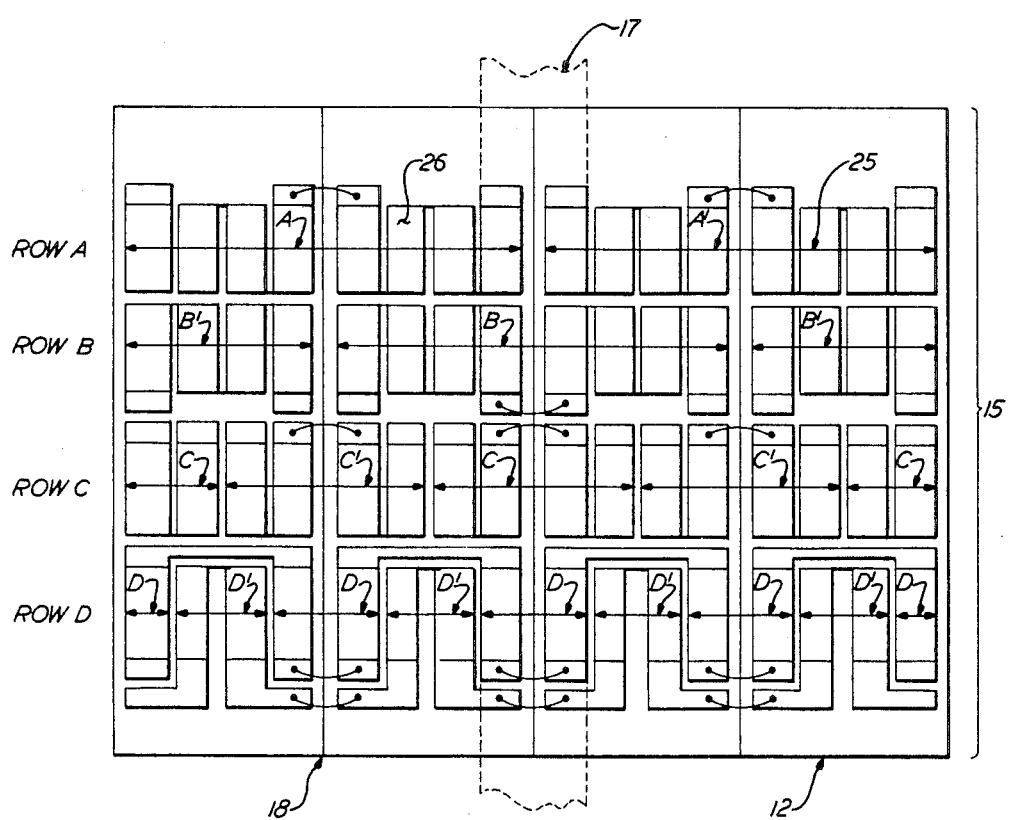
FIG. 3 is a plan view of the detector array adapted for use in the present invention.

FIG. 3 shows a plan view of a detector array 15 adapted for use in the present invention. Four facets 12, seen in side view in FIG. 2, are shown here for illustration purposes only as more or less facets may be used to accomplish the purposes of the present invention. Indeed, the detector array 15, hereinbefore described, may be formed into a single continuous array concentric about the back half of the monolithic cylindrical lens.

The bar of radiation 17 is shown falling on the middle two facets of the detector array 15. The width of each segment is shown by a line 25 which is labeled with the lteer designations corresponding to those shown in FIG. 1A. It can be seen that each segment is further divided into equal detector elements 26. Thus, for example, segments C or C' consist of four detector elements 26 each, connected in series. Segments D or D', for example, consist of 2 detector elements 26 each.

The facets 12 are substantially flat and have a gap 18 between them. The detector elements 26 are attached to the facets 12 in any convenient manner, not shown.

So as to maximize the sensitivity of the improved direction of arrival sensor the optical gain of the present invention, $G_d$, is maximized.

$$G_d = \frac{A}{D} = \frac{2R \sin}{D} (\theta \max)$$

Where
A = effective input aperture width = 2R Sin $\theta$ max
D = minimum segment width
R = radius of the front
$\theta$ max = largest value of the angle of incidence for which the exiting ray is not totally internally reflected.

Returning now to FIG. 2, the aperture size selection is discussed. It can be appreciated that constraints in manufacturing and assembling the detector array may disturb the proper location of the focal line 14. If the focal line is too far from the detector array the radiation would diverge from the focal line to a radiation bar 17 with a width greater than the smallest segment 16. To limit the width of the radiation bar 17 to equal that of the smallest segment the aperture stop 23 is provided in the lens 7.

Once the gap 24 between the back half of the lens 11 and the detector array 15 is selected, based on the design objectives previously discussed and fabrication constraints, the proper aperture size can be determined so as to limit the width of the radiation bar 17 to that of the smallest segment 16. That is, the gap 24 is set as close to the design ideal as is practicable. If the gap 24 is too great, however, due to fabrication constraints, the aperture 23 can be narrowed to limit the width of the radiation bar 17 to that of the smallest segment 16.

An embodiment of the present invention meets the foregoing design criteria by providing a cylindrical lens with the following attributes and dimensions:

Lens material: Zn Se
Index of refraction: 2.42
$R_b$: 5.00 mm
$R_f$: 7.65 mm
Distance from center of cylindrical lens to focal line: 5.50 mm
A (aperture size): 3.36 mm It should be noted that two detectors, as described herein, oriented orthogonally to one another, will allow detection of the direction of arrival of incoming radiation in two planes, thus allowing the determination of the location, in a scene being viewed, of a source of radiation.

It can thus be seen that the present invention does indeed provide new and improved apparatus for detecting the angle of arrival of incoming radiation which has high sensitivity, operates with lower optical intensities than previously possible and which has uniform sensitivity throughout the field of view.

Having thus described the invention with particular reference to the preferred forms thereof, it will be obvious to those skilled in the art to which the invention pertains, after understanding the invention, that various changes and modifications may be made therein without departing from the spirit and scope of the invention, as defined by the claims appended hereto.

What is claimed is:

1. An improved direction of arrival sensor which, in combination, comprises:
   an opaque top mask with a rectangular slit therethrough;
   a cylindrical lens fixedly disposed in the rectangular slit having a front half into which incoming radiation passes and a back half from which radiation emanates;
   detector means disposed on an arc concentric with said cylindrical lens and in spaced relation to said back portion such that radiation emanating from said back half of said cylindrical lens forms a rectangular bar of radiation on said detector means;

said detector means embodying an encoding means which generates a position signal indicative of the position of the rectangular bar of radiation on said detector means; and processing means to process the position signal to determine the angle of incidence the incoming radiation makes with said opaque top mask.

2. An improved direction of arrival sensor as claimed in claim 1 wherein the incoming radiation is focused by the cylindrical lens in the gap between said back half of said cylindrical lens and said detector array.

3. An improved direction of arrival sensor as claimed in claim 2 wherein $R_f$ is greater than $R_b$ if the index of refraction of the material of said cylindrical lens is equal to or greater than 2.0.

4. An improved direction of arrival sensor as claimed in claim 3 wherein $R_f$ is less than $R_b$ if the index of refraction of the material of said cylindrical lens is less than 2.0.

5. An improved direction of arrival sensor as claimed in claim 4 wherein said detector means comprises:

a plurality of rows of radiation sensitive segments, said radiation sensitive segments producing electrical current proportional to the amount of radiation incident on them;

said rows of radiation sensitive segments being electrically isolated from one another, substantially parallel to one another and substantially perpendicular to the rectangular bar of radiation.

6. An improved direction of arrival sensor as claimed in claim 5 wherein the width of the rectangular bar of radiation is equal to the smallest of said radiation sensitive segments in said detector array.

7. An improved direction of arrival sensor as claimed in claim 6 wherein said cylindrical lens includes an aperture stop.

8. An improved direction of arrival sensor as claimed in claim 7 wherein said encoding means comprises:

said radiation sensitive segments being of different sizes and located at a different distances from the longitudinal centerline of said detector array in each of said rows;

each of said rows producing a digital bit of information indicative of the position of the rectangular bar of radiation on that row;

said bits of information comprising a digital angle-of-arrival word indicative of the position of the rectangular bar of information on said detector array and indicative of a unique angle of incidence the incoming radiation makes with the top mask.

9. An improved direction of arrival sensor as claimed in claim 8 wherein said radiation sensitive segments are so sized and arranged in said rows as to form a Grey code encoding scheme embodied in said detector array.

10. An improved direction of arrival sensor as claimed in claim 9 wherein said radiation sensitive segments are further divided into elements which are connected to a common connector.

11. An improved direction of arrival sensor as claimed in claim 10 wherein said elements are disposed on a plurality of facets to form said detector array, said facets being substantially flat and disposed along an arc which is concentric with said back portion of said cylindrical lens.

* * * * *